United States Patent
Yan (10) Patent No.: US 12,206,576 B2
(45) Date of Patent: Jan. 21, 2025

(54) EVPN PACKET FORWARDING METHOD, SYSTEM, STORAGE MEDIUM, AND TERMINAL

(71) Applicant: SANECHIPS TECHNOLOGY CO., LTD., Shenzhen (CN)

(72) Inventor: Xinming Yan, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 414 days.

(21) Appl. No.: 17/618,293

(22) PCT Filed: Jul. 24, 2020

(86) PCT No.: PCT/CN2020/103964
§ 371 (c)(1),
(2) Date: Dec. 10, 2021

(87) PCT Pub. No.: WO2021/013233
PCT Pub. Date: Jan. 28, 2021

(65) Prior Publication Data
US 2022/0368628 A1  Nov. 17, 2022

(30) Foreign Application Priority Data
Jul. 24, 2019 (CN) .......................... 201910671346.7

(51) Int. Cl.
*H04L 45/50* (2022.01)
*H04L 12/46* (2006.01)
*H04L 45/00* (2022.01)

(52) U.S. Cl.
CPC .......... *H04L 45/50* (2013.01); *H04L 12/4641* (2013.01); *H04L 45/66* (2013.01)

(58) Field of Classification Search
CPC ..... H04L 45/50; H04L 12/4641; H04L 45/66; H04L 12/46; H04L 12/465;
(Continued)

(56) References Cited

U.S. PATENT DOCUMENTS 10,841,216 B1 * 11/2020 Hoang .................. H04L 12/465
11,057,295 B1 * 7/2021 Lin .......................... H04L 45/02
(Continued)

FOREIGN PATENT DOCUMENTS

CN  104135420 A  11/2014
CN  105099846 A  11/2015
(Continued)

OTHER PUBLICATIONS

European Patent Office. Extended European Search Report for EP Application No. 20843511.5, mailed Aug. 1, 2022, pp. 1-12.
(Continued)

*Primary Examiner* — Luat Phung
(74) *Attorney, Agent, or Firm* — Vivacqua Crane, PLLC (57) ABSTRACT

Disclosed are a method and a system for EVPN message forwarding, a non-transitory computer-readable storage medium and a terminal device. The method includes: reading an Ethernet segment identifier (ESI) label from a message if the message contains the ESI label after receiving the message from an upstream device, and obtaining a port for an Ethernet segment (ES) corresponding to the ESI label according to the ESI label; reading an egress port for the message; and discarding the message if the port for the ES corresponding to the ESI label obtained according to the ESI label is the same as the egress port for the message.

7 Claims, 5 Drawing Sheets

(58) Field of Classification Search
CPC . H04L 2212/00; H04L 12/4645; H04L 45/74; H04L 12/4633
See application file for complete search history.

(56) References Cited

U.S. PATENT DOCUMENTS

| | | |
|---|---|---|
| 2016/0021015 A1 | 1/2016 | Thoria et al. |
| 2017/0230277 A1 | 8/2017 | Ranns et al. |
| 2018/0302321 A1 | 10/2018 | Manthiramoorthy et al. |
| 2018/0331953 A1* | 11/2018 | Hoang ................ H04L 12/4666 |
| 2019/0036729 A1 | 1/2019 | Warade et al. |
| 2019/0222431 A1* | 7/2019 | Gao .................... H04L 12/4633 |
| 2022/0174006 A1* | 6/2022 | Wang ...................... H04L 45/60 |
| 2022/0321448 A1* | 10/2022 | Bandekar .............. H04L 45/507 |

FOREIGN PATENT DOCUMENTS

| | | |
|---|---|---|
| CN | 108075956 A | 5/2018 |
| CN | 108259291 A | 7/2018 |
| CN | 108259303 A | 7/2018 |
| CN | 108574616 A | 9/2018 |
| CN | 108696414 A | 10/2018 |
| CN | 109861926 A | 6/2019 |
| EP | 3297224 A1 | 3/2018 |
| EP | 3471347 A1 | 4/2019 |
| WO | 2018166233 A1 | 9/2018 |

OTHER PUBLICATIONS

The State Intellectual Property Office of People's Republic of China. First Office Action for CN Application No. 201910671346.7 and English translation, pp. 1-6.
The State Intellectual Property Office of People's Republic of China. First Search Report for CN Application No. 2019106713467 and English translation, mailed Aug. 11, 2022, pp. 1-5.
International Searching Authority. International Search Report and Written Opinion for PCT Application No. PCT/CN2020/103964 and English translation, mailed Oct. 14, 2020, pp. 1-9.
Korean Intellectual Property Office. First Office Action for KR Application No. 10-2021-7041598 and English translation, mailed Apr. 11, 202024, pp. 1-10.

* cited by examiner

EVPN PACKET FORWARDING METHOD, SYSTEM, STORAGE MEDIUM, AND TERMINAL

CROSS-REFERENCE TO RELATED APPLICATION

This application is a national stage filing under 35 U.S.C. § 371 of international application number PCT/CN2020/103964, filed Jul. 24, 2020, which claims priority to Chinese patent application No. 201910671346.7, filed Jul. 24, 2019. The contents of these applications are incorporated herein by reference in their entirety

TECHNICAL FIELD

Embodiments of the present disclosure relate to, but are not limited to, the technical field of network communication, and in particular to a method and a system for Ethernet virtual private network (EVPN) message forwarding, and a non-transitory computer-readable storage medium and a terminal device.

BACKGROUND

EVPN is a two-layer virtual private network (VPN) technique.

The core convergence layer of the control plane of EVPN transfers media access control (MAC) and routing information through the multiprotocol border gateway protocol (MP-BGP), and forwarding entries do not depend on data plane learning. The concept of Ethernet segment (ES) is introduced into EVPN. In an EVPN network, when customer edge (CE) devices are connected to one or more provider edge (PE) devices through a set of Ethernet links, this set of Ethernet links are an Ethernet segment (ES). An ES is identified by a unique Ethernet segment identifier (ESI). EVPN supports three forms of message encapsulation, i.e. Multi-Protocol Label Switching (MPLS) EVPN, Provider Backbone Bridge (PBB) EVPN and Virtual Extensible Local Area Network (VXLAN) EVPN.

Figure 1:
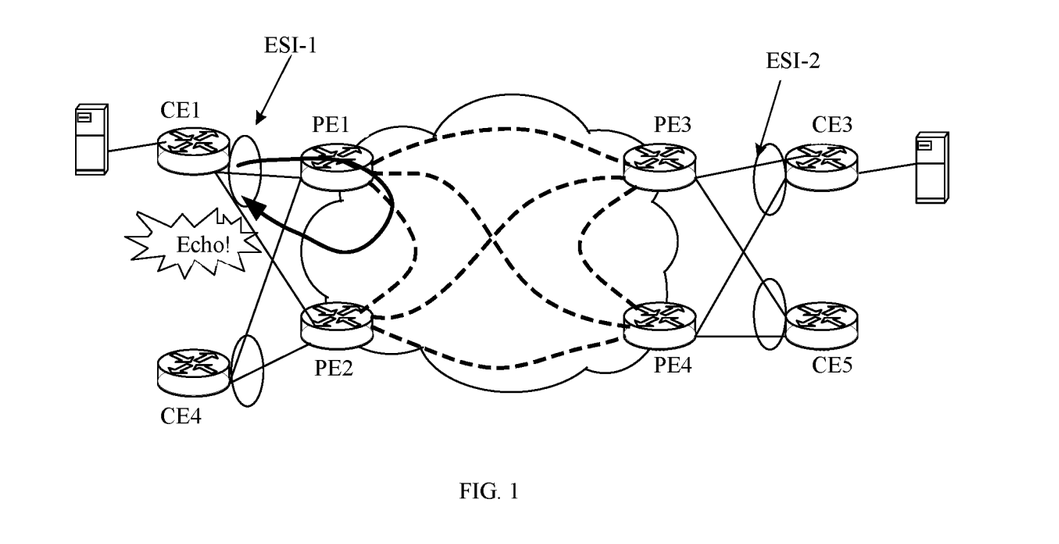
FIG. 1 is a schematic diagram of a situation of looping in the same ES occurring in EVPN in the existing art.

In order to increase reliability, a multi-homing access mode is introduced into EVPN, while redundant links are introduced into the multi-homing access mode, and as a result, a loop exists in the network. As shown in FIG. 1, a provider edge device PE1 receives a message from a customer edge device CE1, the message returns to CE1 after being forwarded by the provider edge device PE1 and the provider edge device PE2, and as a result, a loop is formed, directly resulting in a broadcast storm. In Request For Comments 7432 (RFC7432), a non-designated forwarder (non-DF) is only limited from forwarding broadcast, unknown-unicast and multicast (BUM) messages to an Ethernet segment, but not limited from receiving (or receiving and forwarding) BUM messages from the ES. Such a DF filtering rule can deal with the situation of "repeated packet filtering", but cannot address the situation of looping in the same ES.

SUMMARY

The present disclosure provides a method and a system for Ethernet Virtual Private Network (EVPN) message forwarding, and a non-transitory computer-readable storage medium and a terminal device, to at least solve the problem of looping in the same ES in EVPN.

According to an embodiment of the present disclosure provided is a method for message forwarding for Ethernet Virtual Private Network (EVPN). The method for EVPN message forwarding may include:

reading an Ethernet segment identifier (ESI) label from a message in response to the message containing the ESI label after receiving the message from an upstream device, and obtaining a port for an Ethernet segment (ES) corresponding to the ESI label according to the ESI label;

reading an egress port for the message; and discarding the message in response to the port for the Ethernet segment (ES) corresponding to the ESI label obtained according to the ESI label being the same as the egress port for the message.

According to another embodiment of the present disclosure, further provided is a system for message forwarding for Ethernet Virtual Private Network (EVPN). The system for EVPN message forwarding may include a label processing module, a service processing module, and a message processing module.

The label processing module is configured to read an Ethernet segment identifier (ESI) label from a message in response to the message containing the ESI label after receiving the message from an upstream device, and obtaining a port for an Ethernet segment (ES) corresponding to the ESI label according to the ESI label.

The service processing module is configured to read an egress port for the message.

The message processing module is configured to discard the message in response to the port for the Ethernet segment (ES) corresponding to the ESI label obtained according to the ESI label being the same as the egress port for the message.

According to yet another embodiment of the present disclosure further provided is a computer-readable storage medium, which stores computer-executable instructions. The instructions, when executed by a processor, cause the processor to implement the aforementioned method for EVPN message forwarding.

According to yet another embodiment of the present disclosure further provided is a terminal device for message forwarding, applied to Ethernet Virtual Private Network (EVPN). The terminal device may include: a memory configured to store computer-executable instructions; and a processor configured to execute the computer-executable instructions to implement the aforementioned method for EVPN message forwarding.

BRIEF DESCRIPTION OF DRAWINGS

The drawings are provided for a further understanding of the technical schemes of the present disclosure, and constitute a part of the description. The drawings and the embodiments of the present disclosure are intended to explain the technical schemes of the present disclosure, and do not constitute a limitation on the technical schemes of the present disclosure.

DETAILED DESCRIPTION

Embodiments of the present disclosure will be described hereinafter with reference to the drawings.

The steps shown in the flowcharts in the drawings may be executed in a computer system containing a set of computer-executable instructions. Moreover, although logical orders are shown in the flowcharts, in some cases, the steps shown or described may be executed in orders different from those herein.

In the existing art, in order to solve the problem of looping, an ESI label is introduced into MPLS EVPN. The ESI label is carried in an Ethernet Auto-Discovery per Ethernet Segment (Ethernet AD per ES) route, and a corresponding ESI is learned from a table forwarding table corresponding to the ESI label. When a non-DF node forwards a BUM copy, if an ESI on an egress access circuit (AC) for the BUM copy is the same as that learned through the ESI label, the copy will be discarded. Each copy is separately subject to a DF filtering decision. Thus, by introducing the ESI label, the ability of the non-DF to receive and forward a BUM packet of the CE is kept, and moreover, the problem of looping in the same ES is avoided as well.

The ESI label solution defined by RFC7432 will lead to two layers of private network labels nested in a BUM message, that is, a label stack structure is formed, which is very common in MPLS encapsulation. However, because a VXLAN network identifier (VNI) label stack structure is not defined in VXLAN encapsulation, the usage of the ESI label in MPLS EVPN cannot be directly applied in VXLAN EVPN. For VXLAN EVPN, the problem of looping in the same ES has to be solved.

Figure 2:
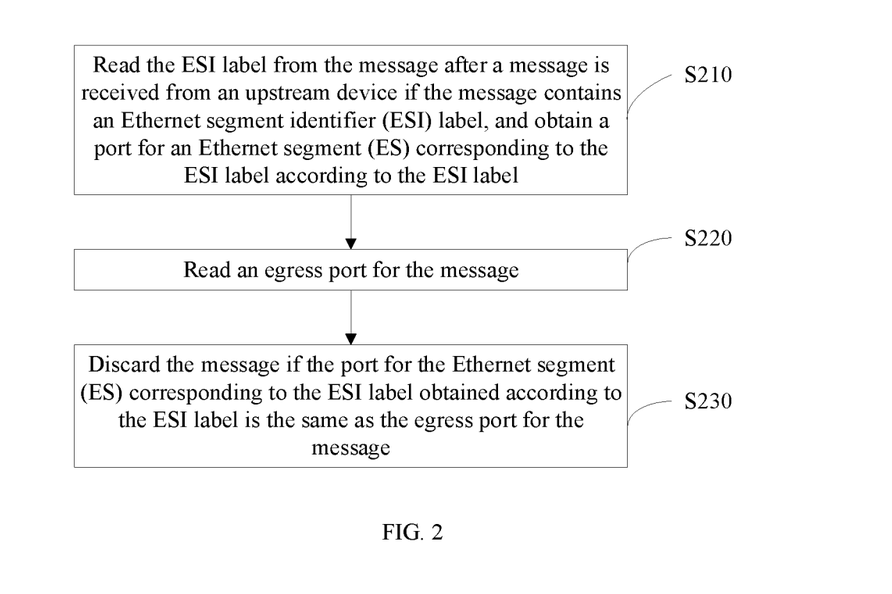
FIG. 2 is a schematic flowchart of a method for EVPN message forwarding according to an embodiment of the present disclosure.

According to an embodiment of the present disclosure, a method for EVPN message forwarding is provided and applicable to VXLAN EVPN. As shown in FIG. 2, the method includes steps S210 to S230.

At S210, after a message is received from an upstream device, if the message contains an Ethernet segment identifier (ESI) label, the ESI label is read from the message, and a port for an Ethernet segment (ES) corresponding to the ESI label is obtained according to the ESI label.

The upstream device may be a customer edge (CE) device or a provider edge (PE) device; and the message is a BUM message.

At S220, an egress port for the message is read.

The egress port for the message may be obtained by looking up in a MAC forwarding table.

At S230, the message is discarded if the port for the ES corresponding to the ESI label obtained according to the ESI label is the same as the egress port for the message.

Compared with the existing art, the method according to the present disclosure includes: the ESI label is read from the message if the message contains the ESI label after the message is received from the upstream device, and a port connected to the ES corresponding to the ESI label is obtained according to the ESI label; the egress port for the message is read; and the message is discarded if the port for the ES corresponding to the ESI label obtained according to the ESI label is the same as the egress port for the message. The method of the present disclosure can solve the problem of looping in the same ES in EVPN.

In an embodiment of the present disclosure, if the upstream device includes an upstream customer edge (CE) device, the method further includes: encapsulating an ESI label into the received message after a message is received from the CE device if an access circuit is a non-designated forwarder (non-DF). The AC is an independent link or circuit connected with the CE and the PE; an interface of the AC may be a physical interface or a logic interface; and attributes of the AC include encapsulation type, maximum transmission unit (MTU) and interface parameters of a specific link type.

In the embodiment of the present disclosure, the step of encapsulating an ESI label into the received message includes: adding an ESI flag field and an ESI label value field into header information of the received message, where the ESI flag field is configured to mark whether the ESI label is encapsulated in the header information or not.

Figure 3:
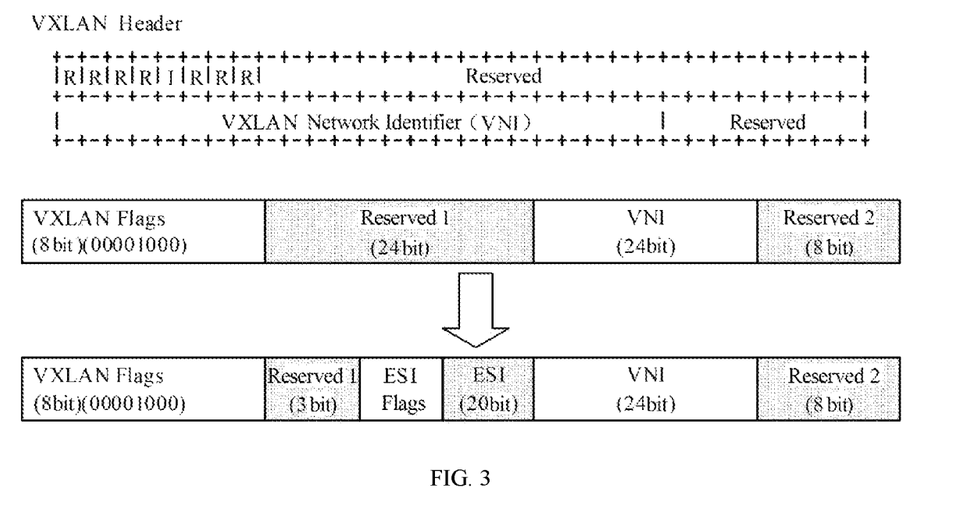
FIG. 3 is a schematic diagram of encapsulating an ESI label into a VXLAN EVPN message according to an embodiment of the application.

In the embodiment of the present disclosure, the step of adding an ESI flag field and an ESI label value field into header information of the received message includes: taking one of a plurality of bits in a reserved field of the header information of the message as the ESI flag field, and taking all or part of the plurality of bits other than the one bit taken as the ESI flag field in the reserved field as the ESI label value field; determining that no ESI label is encapsulated in the header information of the message if the value of the ESI flag field is 0; and determining that the content of the ESI label value field is valid if the value of the ESI flag field is 1. In FIG. 3, a schematic diagram of encapsulating the ESI label in a VXLAN EVPN message is provided.

In the embodiment of the present disclosure, the step of reading the ESI label from the message if the message contains the ESI label includes: reading the header information of the message; and judging whether the ESI label is encapsulated in the header information according to the ESI flag field contained in the header information, and reading the ESI label value from the ESI label value field contained in the header information in response to a judgment result that the ESI label is encapsulated in the header information.

The embodiment of the present disclosure achieves split horizon at an EVPN access, solving the problem of looping in the same ES in EVPN.

An application example is given below to illustrate the embodiment of the present disclosure.

Figure 4:
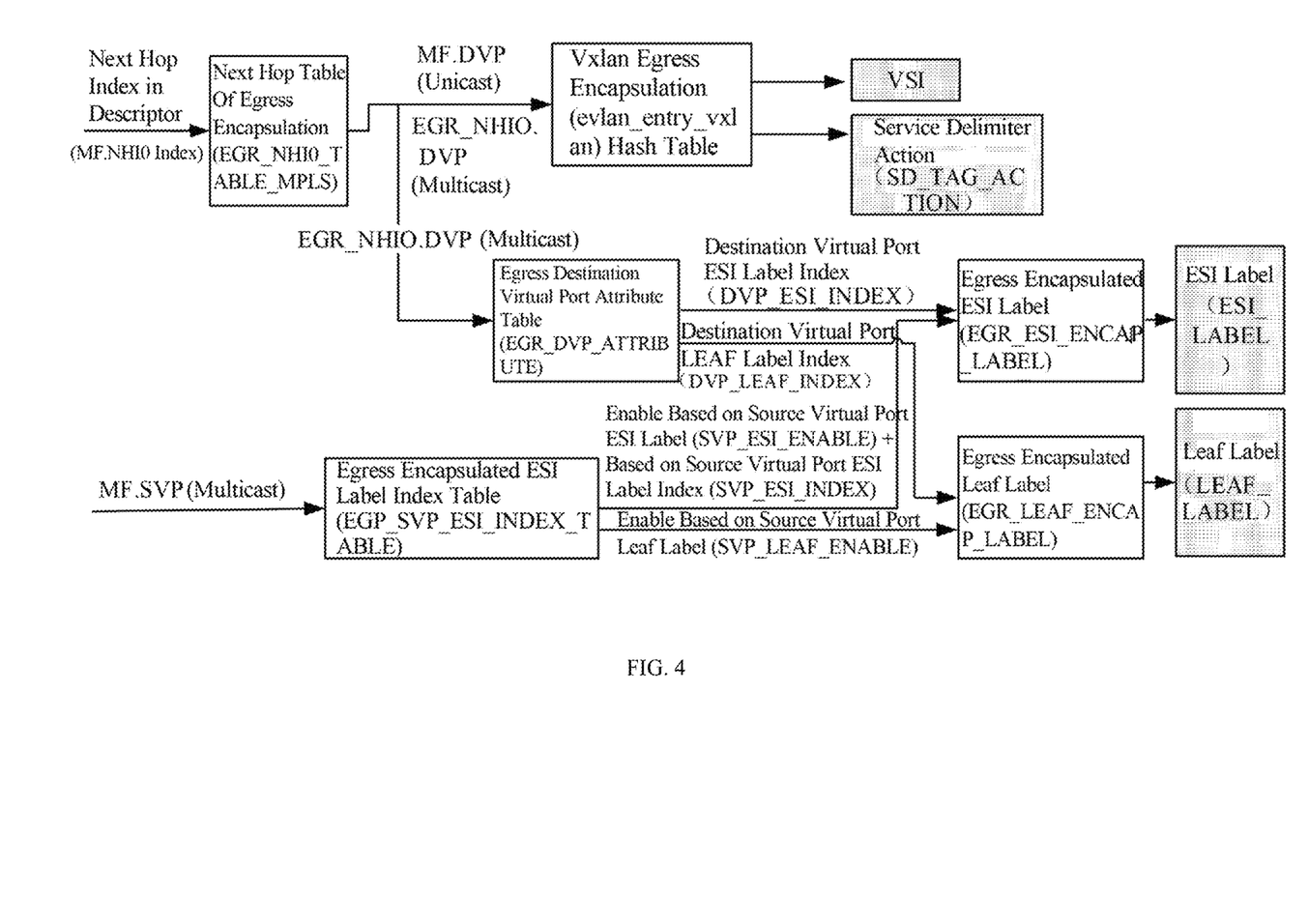
FIG. 4 is a schematic flowchart of a processing flow of a VXLAN EVPN upper loop chip according to an embodiment of this application.

Taking VXLAN EVPN as an example, based on a network connection architecture shown in FIG. 1, an upstream device (PE1) and a downstream device (PE2) need to be configured in the present application example:

1. A configuration flow of an upper loop chip of the PE1 is shown as FIG. 4, and the meanings of the symbols appearing in FIG. 4 are explained as follows:

MF.NHI0_Index: next hop index in a descriptor; EGR_NHI0_TABLE_MPLS: next hop table of egress encapsulation; MF.DVP: destination virtual port in the descriptor; EGR_NHI0.DVP: destination virtual port (multicast) corresponding to the next hop of egress encapsulation; evlan_entry_vxlan: vxlan egress encapsulation Hash table; VNI: virtual network identifier; SD_TAG_ACTION: service delimiter action; EGR_DVP_ATTRIBUTE: egress destination virtual port attribute table; DVP_ESI_INDEX: destination virtual port ESI label index; DVP_LEAF_INDEX: destination virtual port LEAF label index; EGR_ESI_ENCAP_LABEL: ESI label of egress encapsulation; EGR_SVP_ESI_INDEX_TABLE: egress encapsulated ESI label index table; EGR_LEAF_ENCAP_LABEL: egress encapsulated LEAF label.

An AC for access of CE1 to PE1 is configured as a non-DF. 1 bit of DF/Non-DF and an encapsulated ESI label index svp_esi_encap_index[4:0] are configured based on a source virtual port (SVP). After a DF flag is acquired, 1 bit of descriptor MF.esi_present (this descriptor is used to identify whether an ESI label needs to be encapsulated, and only if a forwarding result is a BUM message and the SVP is Non-DF can MF.esi_present be set) is generated according to the forwarding result (unicast or BUM), and the descriptor is stored into a memory management unit (MMU) cache and brought to a downlink.

An ESI label value is determined by the source virtual port and the destination virtual port together. An encapsulated ESI label DVP index dvp_esi_ecap_index[28:24] is configured based on the DVP. By combining the encapsulated ESI label index of the destination virtual port with the encapsulated ESI label index of the source virtual port, a final index for searching the ESI label value is calculated, that is, svp_esi_encap_index[4:0] is searched out according to the SVP and dvp_esi_ecap_index[28:24] is searched out according to the DVP. {Esi_label_vld [20:20], esi_label[19:0]} is then searched out using {svp_esi_encap_index, dvp_esi_ecap_index} as an index, and the BUM message sent from PE1 to PE2 carries this ESI label.

Figure 5:
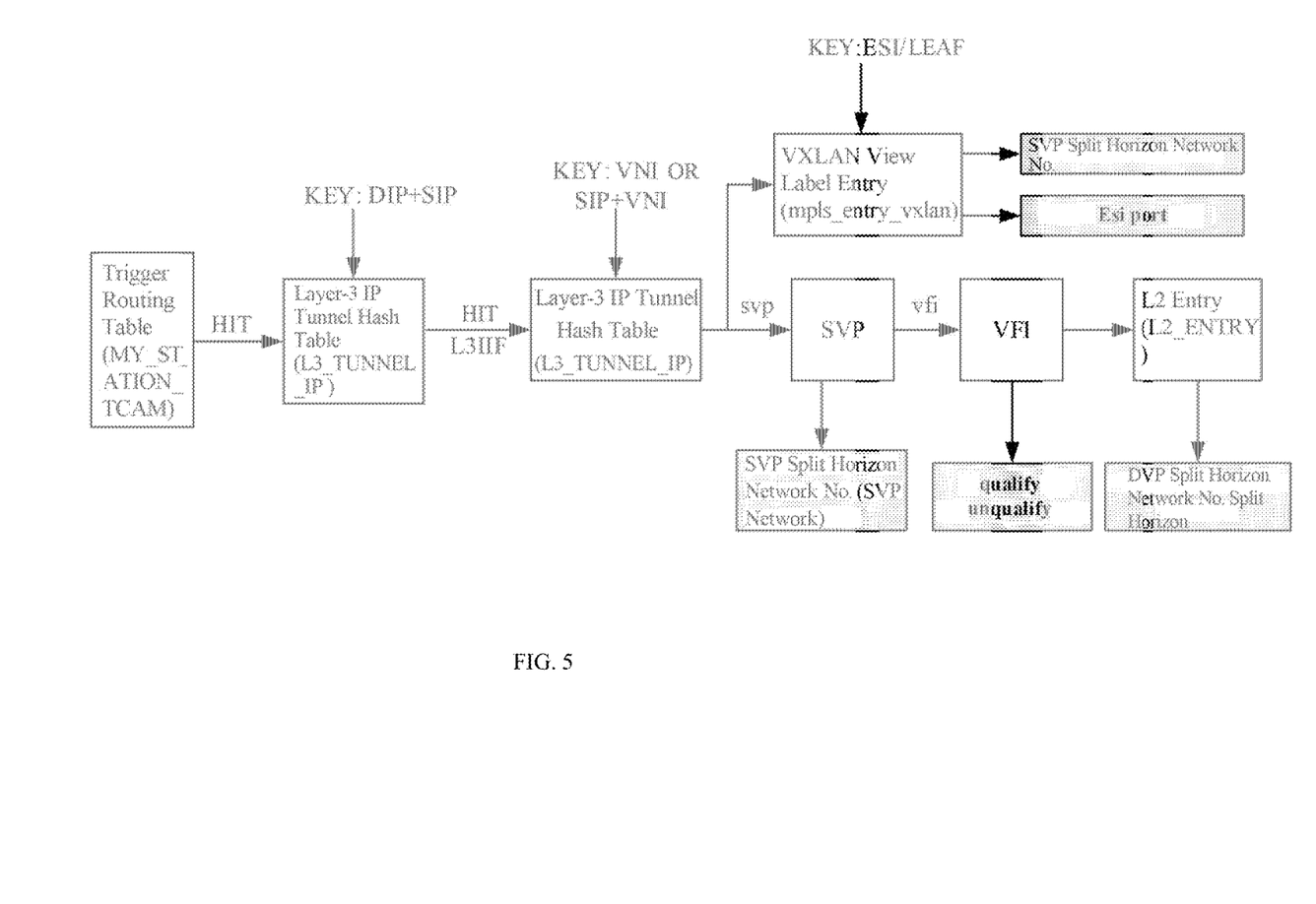
FIG. 5 is a schematic flowchart of VXLAN EVPN lower loop chip processing according to an embodiment of this application.

2. A configuration flow of a lower loop chip of the PE2 is shown as FIG. 5, and the meanings of the symbols appearing in FIG. 5 are explained as follows:

MY_STATION_TCAM: MY STATION TCAM table; L3_TUNNEL_IP: layer-3 Internet Protocol (IP) tunnel Hash table; mpls_entry_vxlan: VXLAN view label entry; SVP: source virtual port; VFI: virtual forwarding instance; L2_ENTRY: L2 MAC table; Esi port: ESI port; svp network: svp split-horizon network number; dvp network: dvp split-horizon network number.

An AC for access of CE1 to PE2 is configured as a DF. The DF is responsible for forwarding a BUM message into an ES, while the non-DF cannot forward a BUM message into the ES. The SVP, mpls_entry_vxlan view, KEY:VNI or VNI+SIP, RESULT: SVP of a lower loop are configured at an MPLS module. Physical port numbers, mpls_entry_mpls view, KEY:ESI and RESULT:ESI_SGLP corresponding to ESI labels are configured at the MPLS.

On each device, each ESI label only corresponds to one of the physical port numbers (including Trunk ports), and a port of PE2 which is connected to CE1 is the physical port number of PE2 which corresponds to the ESI label. A next hop corresponding to the DVP is configured, and an egress port corresponding to the next hop is the port of PE2 which is connected to CE1.

3. VXLAN EVPN upper and lower loop message forwarding flow:

A BUM message is sent from CE1 to PE1, and since the AC is a non-DF, an ESI label has been encapsulated in the message received by PE1 and forwarded to PE2.

Figure 6:
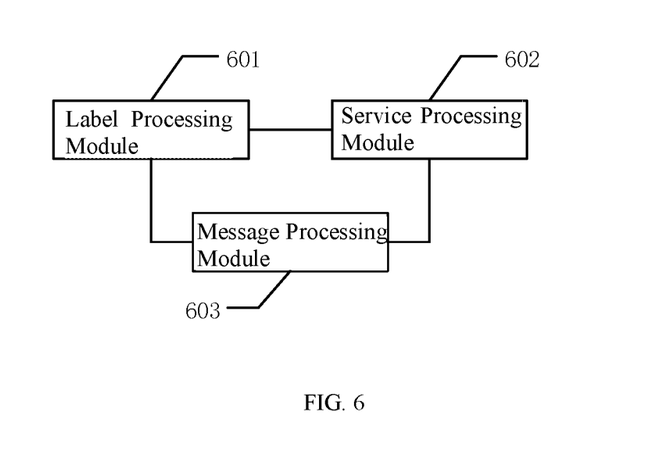
FIG. 6 is a block diagram of a system for EVPN message forwarding according to an embodiment of the present disclosure.

The message arrives at PE2. Since the AC for access of CE1 to PE2 is configured as a DF, a BUM message can be received and forwarded. According to the ESI label in the message, it is identified that the connected ES port is the same as the message egress port obtained by service forwarding, the message is discarded, preventing the message sent by CE1 from returning to CE1, and thereby split horizon at a VXLAN EVPN access is achieved. According to an embodiment of the present disclosure a system for EVPN message forwarding is further provided. As shown in FIG. 6, the system includes a label processing module 601, a service processing module 602 and a message processing module 603. The label processing module 601 is configured to read an Ethernet segment identifier (ESI) label from a message if the message contains the ESI label after the message is received from an upstream device, and to obtain a port for an Ethernet segment (ES) corresponding to the ESI label according to the ESI label. The upstream device may be a customer edge (CE) device or a provider edge (PE) device, and the message is a BUM message. The service processing module 602 is configured to read an egress port for the message. The message processing module 603 is configured to discard the message if the port for the ES corresponding to the ESI label obtained according to the ESI label is the same as the egress port for the message.

In an embodiment, the upstream device includes an upstream customer edge (CE) device; and the label processing module 601 is further configured to encapsulate the ESI label into the received message when an access circuit is a non-designated forwarder (non-DF) after the message is received from the upstream customer edge (CE) device. The AC is an independent link or circuit connected with the CE and the PE; an AC interface may be a physical interface or a logic interface; and AC attributes include encapsulation type, maximum transmission unit (MTU) and interface parameters of a specific link type.

In an embodiment, the label processing module 601 is configured to encapsulate an ESI label into the received message in a following way: adding an ESI flag field and an ESI label value field into header information of the received message, where the ESI flag field is configured to mark whether the ESI label is encapsulated in the header information or not.

In an embodiment, the label processing module 601 is configured to add an ESI flag field and an ESI label value field into header information of the received message in a following way: taking one of a plurality of bits in a reserved field of the header information of the message as the ESI flag field, and taking all or part of the plurality of bits other than the one bit taken as the ESI flag field in the reserved field as the ESI label value field; determining that no ESI label is encapsulated in the header information of the message if the value of the ESI flag field is 0; and determining that the content of the ESI label value field is valid if the value of the ESI flag field is 1. In FIG. 3, a schematic diagram of encapsulating an ESI label in a VXLAN EVPN message is provided.

In an embodiment, the label processing module 601 is configured to read an Ethernet segment identifier (ESI) label from the message if the message contains the ESI label, including: reading the header information of the message; and judging whether the ESI label is encapsulated in the header information according to the ESI flag field contained in the header information, and reading the ESI label value from the ESI label value field contained in the header information in response to a judgment result that the ESI label is encapsulated in the header information.

According to the embodiments of the present disclosure split horizon at an EVPN access is achieved, and therefore the problem of looping in the same ES in EVPN is solved.

According to an embodiment of the present disclosure, a computer-readable-and-writable storage medium is further provided. The non-transitory computer-readable storage medium stores computer-executable instructions which, when executed by a processor, cause the processor to implement the method for EVPN message forwarding as described in the above embodiments.

According to an embodiment of the present disclosure further provides a terminal device for EVPN message forwarding is further provided. The terminal device includes a memory and a processor. The memory is configured to store computer-executable instructions. The processor us configured for execute the computer-executable instructions to implement the method for EVPN message forwarding as described in the above embodiments.

It can be understood by those having ordinary skill in the art that, all or some of the steps in the method and the functional modules/units in the system and the device disclosed above may be implemented as software, firmware, hardware and an appropriate combination thereof. In the hardware implementation, the division between the functional modules/units mentioned in the above description does not necessarily correspond to the division of physical components. For example, a physical component may have multiple functions, or a function or a step may be cooperatively executed by multiple physical components. Some or all of the components may be implemented as software executed by a processor (such as a digital signal processor or a microprocessor), hardware or an integrated circuit (such as an application-specific integrated circuit). Such software may be distributed on computer-readable media, which may include computer storage media (or non-transitory media) and communication media (or transitory media). As well-known to those having ordinary skill in the art, the term "computer storage media" include volatile and nonvolatile, removable and non-removable media implemented in any method or technology for storing information (such as computer-readable instructions, data structures, program modules or other data). Computer storage media include but are not limited to random access memories (RAMs), read-only memories (ROMs), electrically erasable programmable read-only memories (EEPROM), flash memories or other memory technologies, portable compact disc read-only memories (CD-ROMs), digital versatile discs (DVDs) or other optical disk storages, magnetic cassettes, magnetic tapes, magnetic disk storages or other magnetic storage devices or any other media that can be used to store desired information and can be accessed by computers. Furthermore, it is well-known to those having ordinary skill in the art that communication media typically contain computer-readable instructions, data structures, program modules or other data in a modulated data signal such as carriers or other transmission mechanisms, and can include any information delivery media.

The invention claimed is:

1. A method for message forwarding for Ethernet Private Network (EVPN), comprising:
    reading an Ethernet Segment Identifier (ESI) label from a message in response to the message containing the ESI label after receiving the message from an upstream device within a same Ethernet Segment (ES) in EVPN, and obtaining a port for the ES corresponding to the ESI label according to the ESI label;
    reading an egress port for the message; and
    discarding the message in response to the port for the ES corresponding to the ESI label obtained according to the ESI label being the same as the egress port for the message.

2. The method for message forwarding for EVPN of claim 1, in response to the upstream device comprising an upstream Customer Edge (CE) device, further comprising:
    encapsulating the ESI label into the received message in response to an access circuit being a non-Designated Forwarder (non-DF) after the message is received from the upstream CE device.

3. The method for message forwarding for EVPN of claim 2, wherein encapsulating the ESI label into the received message comprises:
    adding an ESI flag field and an ESI label value field into header information of the received message, the ESI flag field being configured for marking whether the ESI label is encapsulated in the header information or not.

4. The method for message forwarding for EVPN of claim 3, wherein adding an ESI flag field and an ESI label value field into header information of the received message comprises:
    taking one of a plurality of bits in a reserved field of the header information of the message as the ESI flag field, and taking all or part of the plurality of bits other than the one bit taken as the ESI flag field in the reserved field as the ESI label value field;
    determining that no ESI label is encapsulated in the header information of the message in response to the value of the ESI flag field being 0; and determining that a content of the ESI label value field is valid in response to the value of the ESI flag field being 1.

5. The method for message forwarding for EVPN of claim 1, wherein reading an ESI label from a message in response to the message containing the ESI label comprises:
    reading the header information of the message; and
    judging whether the ESI label is encapsulated in the header information according to the ESI flag field contained in the header information, and reading the ESI label value from the ESI label value field contained in the header information in response to a judgment result that the ESI label is encapsulated in the header information.

6. A non-transitory computer-readable storage medium, storing computer-executable instructions which, when executed by a processor, cause the processor to perform a method for message forwarding for Ethernet Virtual Private Network (EVPN) comprising:
    reading an Ethernet Segment Identifier (ESI) label from a message in response to the message containing the ESI label after receiving the message from an upstream device within a same Ethernet Segment (ES) in EVPN, and obtaining a port for the ES corresponding to the ESI label according to the ESI label;
    reading an egress port for the message; and
    discarding the message in response to the port for the ES corresponding to the ESI label obtained according to the ESI label being the same as the egress port for the message.

7. A terminal device for message forwarding for Ethernet Virtual Private Network (EVPN), comprising:
    a memory, configured to store computer-executable instructions; and a processor, configured to execute the computer-executable instructions to perform a method for message forwarding for EVPN comprising:

reading an Ethernet Segment Identifier (ESI) label from a message in response to the message containing the ESI label after receiving the message from an upstream device within a same Ethernet Segment (ES) in EVPN, and obtaining a port for the ES corresponding to the ESI label according to the ESI label;

reading an egress port for the message; and discarding the message in response to the port for the ES corresponding to the ESI label obtained according to the ESI label being the same as the egress port for the message.

* * * * *